Oct. 21, 1947.　　　S. S. MOORE　　　2,429,366
POWER CONTROL UNIT
Filed July 30, 1945　　　2 Sheets-Sheet 1

INVENTOR
Stanley S. Moore
BY
ATTORNEYS

Oct. 21, 1947.  S. S. MOORE  2,429,366
POWER CONTROL UNIT
Filed July 30, 1945   2 Sheets-Sheet 2

INVENTOR
Stanley S. Moore
BY
ATTORNEYS

Patented Oct. 21, 1947

2,429,366

UNITED STATES PATENT OFFICE 2,429,366

POWER CONTROL UNIT

Stanley S. Moore, Stockton, Calif.

Application July 30, 1945, Serial No. 607,805

11 Claims. (Cl. 192—17)

This invention relates in general to improvements in power winches of the type known as power control units, and which are intended to be used, for example, on tractors to operate cable actuated implements on or trailing the tractor.

One object of this invention is to provide a power control unit which is relatively light weight, compact, simplified in construction, and designed for ease of manufacture, maintenance, and repair.

A further object of the invention is to provide a power control unit which is adapted to be belt driven.

An additional object of the invention is to provide a power control unit embodying novel means for easy and quick adjustment of the clutch, or the brake, selectively, of the unit; such adjustment being made without the need of special tools, or the necessity of dismantling any part of the device.

A further object of the invention is to produce an exceedingly effective power control unit.

These objects are accomplished by means of such structure and relative arrangement of parts as will fully appear by a perusal of the following specification and claims.

In the drawings similar characters of reference indicate corresponding parts in the several views.

Figure 1:
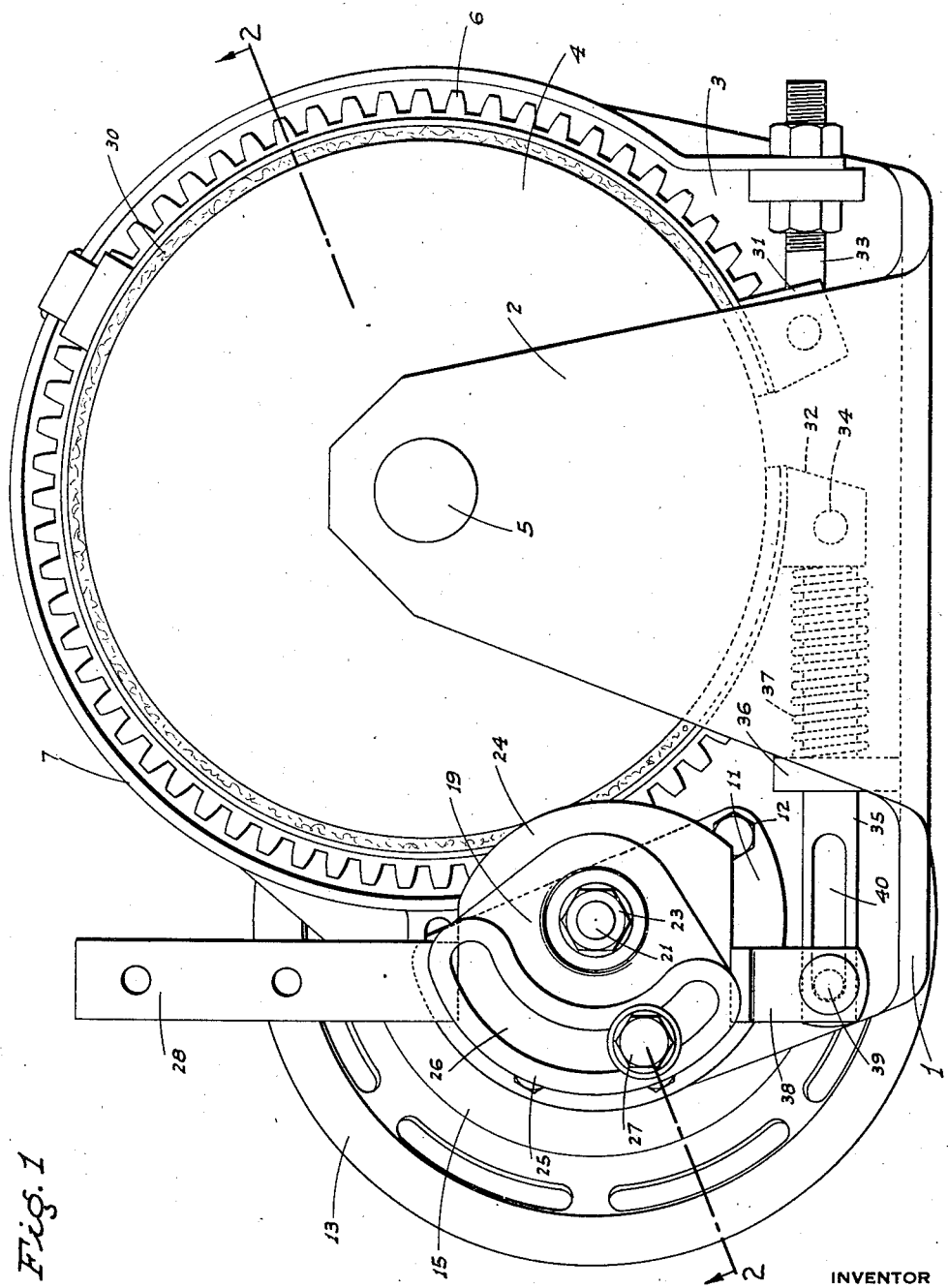
Figure 1 is a front elevation of the improved power control unit.
Figure 2:
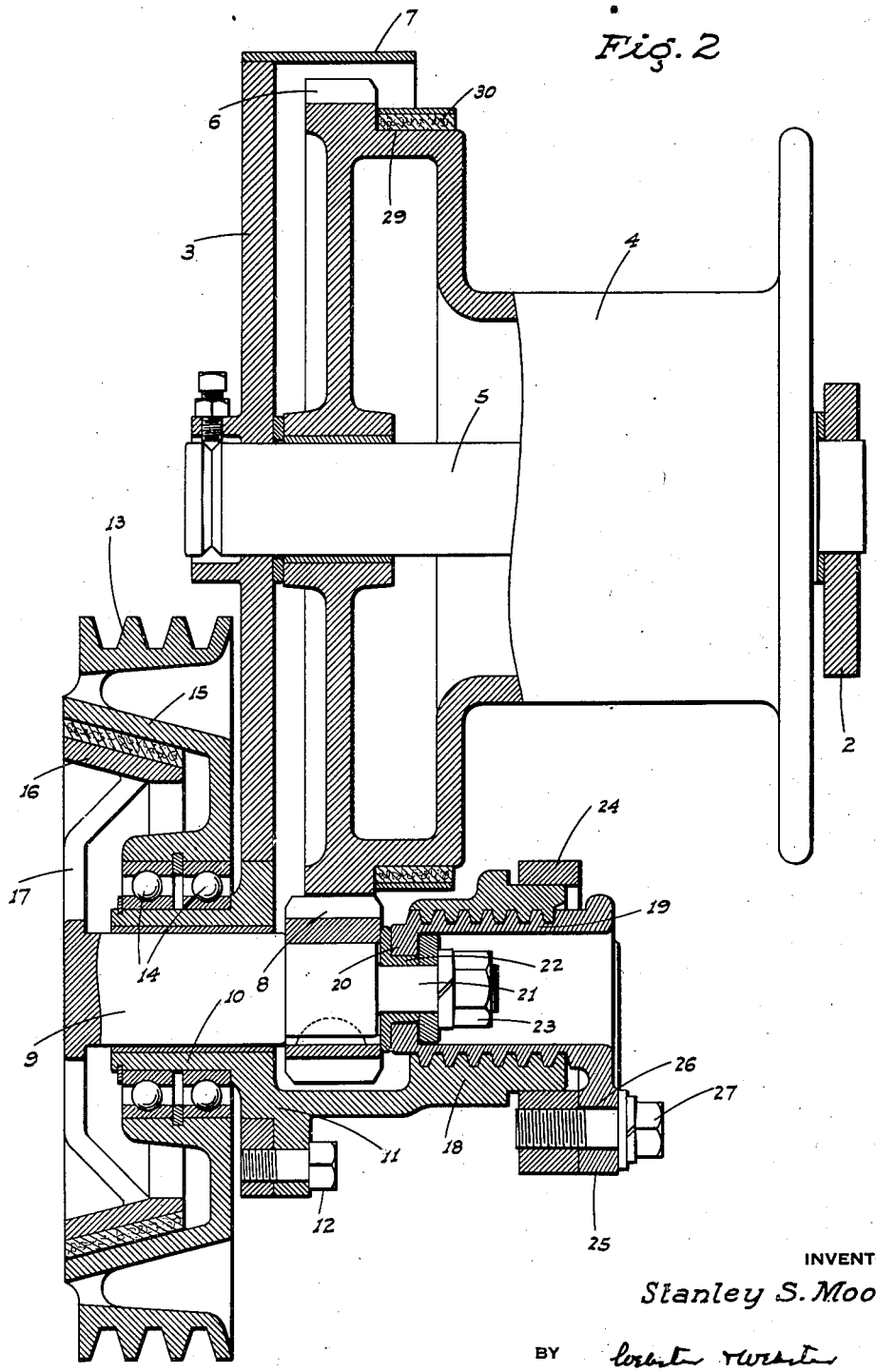
Figure 2 is a cross section on line 2—2 of Fig. 1.

Referring now more particularly to the characters of reference on the drawings, the improved power control unit comprises a rigid base 1 adapted to be rigidly secured to a support; there being an upstanding front bracket 2, and an upstanding, enlarged back wall 3 disposed in parallel spaced-apart relation. A cable drum 4 is disposed in rotatable relation between the front bracket 2 and back wall 3 and is supported therebetween by means of a shaft 5.

At its inner end the cable drum 4 is formed with an external gear 6 which is shielded at the top and down the sides by a guard 7 formed in connection with the back wall 3.

At one side thereof, and slightly below the horizontal plane of the shaft 5 the gear 6 runs in mesh with a pinion 8 fixed on a stub shaft 9 which extends rearwardly in rotatable relation through a hub or boss 10. The hub 10 is an integral part of a casting, indicated at 11, secured in connection with the back wall 3 by bolts 12.

To the rear of the back wall 3 the hub 10 supports a multi-groove pulley 13 by means of antifriction bearings 14. Inwardly of the grooved portion of the pulley 13 the latter is formed with a radially inwardly facing, axially tapered, female clutch part 15, with which a matching male clutch part 16 cooperates. The male clutch part 16 is fixed in connection with the adjacent or rear end of the stub shaft 9 by means of a spider 17.

A fixed sleeve 18 formed as a part of the casting 11 projects forwardly beyond the pinion 8 in concentric relation to the axis of the latter. An internal adjustment nut 19 is threaded into the fixed sleeve 18, and at its inner end said adjustment nut is provided with a reduced-diameter annular flange 20 which surrounds a stud 21 projecting axially outwardly from the pinion 8. The annular flange 20 is rotatably but axially immovably secured in connection with the stud 21 by means of a bushing assembly 22 and a retaining nut 23 threaded onto the free end of said stud. It will thus be seen that the internal adjustment nut 19 can be turned within the sleeve 18 in one direction or the other, resulting in advancing or retracting of the stub shaft 9 and consequent engagement or disengagement of the clutch comprised of parts 15 and 16. The pinion 8 merely slides axially a slight distance relative to the gear 6 when such clutch control takes place. The internal adjustment nut 19 is manually operated as follows:

A rotary collar 24 is mounted on the fixed sleeve 18 adjacent its outer end, and the internal adjustment nut 19 has a radial adjustment plate 25 formed therewith at the outer end; said adjustment plate including an arcuate, concentric slot 26 therein. An adjustment bolt 27 extends through the slot 26 and is threaded into an adjacent part of the rotary collar 24, said bolt normally being tight whereby to lock the collar 24 and adjustment plate 25 against relative rotation. A control lever 28 is fixed on and upstands from the rotary collar 24. With this arrangement swinging of the lever in one direction or the other rotates the internal adjustment nut 19 so as to advance or retract the same, for the purpose of clutch control.

The cable drum 4, at its inner end and adjacent the gear 6, is formed with a brake drum 29 about which a lined brake band 30 extends; said brake band having its adjacent ends disposed at the bottom of the drum and formed with ears 31 and 32, respectively. The ear 31 is adjustably dead-ended or anchored, as at 33, while the ear 32 is pivotally connected, as at 34, with a substantially tangentially extending brake release link 35 which passes in guided relation through a bracket 36. A compression spring 37 about the link 35 between the ear 32 and bracket 36 normally urges the brake band 30 to set position, preventing rotation of the cable drum 4.

At the bottom the rotary collar 24 is provided with a depending brake control arm 38 provided with a cross pin 39 riding in a longitudinal slot 40 in the adjacent end portion of the brake release link 35. When the control lever 28 is swung in a clockwise direction, the brake release link 35 is drawn in a direction to compress the spring 37 and release the brake band 30, whereupon the cable drum is free to rotate. The internal adjustment nut 19 is threaded so that swinging of the control lever 28 in said clockwise direction also brings the clutch comprised of parts 15 and 16 into engagement. With the brake band 30 released, and the clutch engaged, a drive is imparted from the pulley 13 through the stub shaft 9 to the pinion 8 and thence through the gear 6 to said cable drum 4. Upon release of the control lever 28 the spring 37 resets the brake band 30 and pulls the link 35 in a direction such that the cross pin 39 engages in the outer end of the slot 40, swinging the lever 28 back to neutral position, and in which position the clutch is released.

In order to adjust the clutch, the adjustment bolt 27 is loosened, the internal adjustment nut 19 rotated in one direction or the other to a new position, and the bolt 27 then tightened. The operation is a simple one, requires no special tools, and can be accomplished without dismantling any part of the device.

Similarly, the brake can be adjusted by loosening the bolt 27, maintaining the internal adjustment nut 19 stationary, and swinging the control lever 28 to a new position of adjustment of the cross pin 39 in slot 40. When the adjustment is made the bolt 27 is tightened.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, what is claimed as new and useful and upon which Letters Patent is desired is:

1. A power control unit comprising a support, a cable drum journaled on the support, a gear in connection with the cable drum, a stub shaft journaled on the support adjacent the gear and parallel to its axis, a pinion on the shaft in mesh with the gear, a drive wheel rotatably mounted about the shaft adjacent one end thereof, a clutch including one part on the drive wheel and another part on the shaft, said other part and the shaft being axially shiftable as a unit to engage or disengage the clutch, and manually operated means to shift said shaft in one direction or the other; there being a projecting hub mounted on the support, the shaft being journaled in and extending through said hub, and said drive wheel being rotatably mounted on the projecting portion of said hub.

2. A power control unit as in claim 1 in which said other clutch part is secured to the shaft beyond one end of the hub, and said shifting means is connected to the shaft beyond the other end of the hub.

3. A power control unit comprising a support, a cable drum journaled on the support, a gear in connection with the drum, a projecting hub mounted on the support, the hub and drum axes being parallel, a shaft journaled in and extending through the hub, a pinion on the shaft in mesh with the gear, a drive wheel rotatably mounted on the projecting hub, a clutch including one part on the drive wheel and another part on an adjacent portion of the shaft, said other part and the shaft being axially shiftable as a unit to engage or disengage the clutch, and manually operated means to shift said shaft in one direction or the other.

4. A power control unit comprising a support, a cable drum journaled on the support, a gear in connection with the drum, a projecting hub mounted on the support, the hub and drum axes being parallel, a shaft journaled in and extending through the hub, a pinion on the shaft in mesh with the gear, a drive wheel rotatably mounted on the projecting hub, a clutch including one part on the drive wheel and another part on an adjacent portion of the shaft, said other part and the shaft being axially shiftable as a unit to engage or disengage the clutch, and manually operated means to shift said shaft in one direction or the other; said shifting means comprising a sleeve mounted in fixed position axially beyond one end of the shaft, an internal adjustment nut threaded in the sleeve, means relatively rotatably connecting adjacent ends of said shaft and nut for axial movement together, and a hand element operatively connected to said adjustment nut.

5. A power control unit comprising a support, a cable drum journaled on the support, a gear in connection with the drum, a projecting hub mounted on the support, the hub and drum axes being parallel, a shaft journaled in and extending through the hub, a pinion on the shaft in mesh with the gear, a drive wheel rotatably mounted on the projecting hub, a clutch including one part on the drive wheel and another part on an adjacent portion of the shaft, said other part and the shaft being axially shiftable as a unit to engage or disengage the clutch, and manually operated means to shift said shaft in one direction or the other; said shifting means comprising a sleeve mounted in fixed position axially beyond one end of the shaft, an internal adjustment nut threaded in the sleeve, means relatively rotatably connecting adjacent ends of said shaft and nut for axial movement together, a rotary collar on the sleeve adjacent its outer end, a radial plate on the corresponding end of the adjustment nut, said plate having an arcuate slot therein concentric to the axis of the collar and lapping the latter, a normally tight, headed bolt extending through the slot and threaded into said collar, and a hand lever fixed on and radiating from said collar.

6. A power control unit comprising a base, a front bracket upstanding from the base, a back wall upstanding from the base, a cable drum journaled between said front bracket and back wall, a gear formed on the end of the drum adjacent the wall, a rearwardly projecting hub mounted on the wall and opening therethrough radially out from the gear, a shaft extending through the hub, a pinion on the shaft in mesh with the gear, a drive wheel rotatably mounted on the hub, a clutch including one part on the drive wheel and another part on the rear end of the shaft, said other part and the shaft being axially shiftable as a unit to engage or disengage the clutch, and manually operated means to shift said shaft in one direction or the other; said shifting means including a sleeve mounted in fixed position axially beyond the forward end of the shaft, an internal adjustment nut threaded in the sleeve, means relatively rotatably connecting adjacent ends of said shaft and nut for axial movement together, and a hand element operatively connected to said adjustment nut.

7. A power control unit comprising a base, a front bracket upstanding from the base, a back wall upstanding from the base, a cable drum journaled between said front bracket and back wall, a gear formed on the end of the drum adjacent the wall, a rearwardly projecting hub mounted on the wall and opening therethrough radially out from the gear, a shaft extending through the hub, a pinion on the shaft in mesh with the gear, a drive wheel rotatably mounted on the hub, a clutch including one part on the drive wheel and another part on the rear end of the shaft, said other part and the shaft being axially shiftable as a unit to engage or disengage the clutch, and manually operated means to shift said shaft in one direction or the other; said shifting means including a sleeve mounted in fixed position axially beyond the forward end of the shaft, an internal adjustment nut threaded in the sleeve, means relatively rotatably connecting adjacent ends of said shaft and nut for axial movement together, a rotary collar on the sleeve adjacent its outer end, a radial plate on the corresponding end of the adjustment nut, said plate having an arcuate slot therein concentric to the axis of the collar, and lapping the latter, a normally tight, headed bolt extending through the slot and threaded into said collar, and a hand lever fixed on and radiating from said collar.

8. A power control unit as in claim 7 in which the cable drum has a brake band unit associated therewith, said unit including a longitudinally movable, brake release link extending to a point adjacent the rotary collar, said link being movable in a direction intersecting the axis of said collar, and means between said collar and link operative to shift the latter in a brake release direction upon rotation of the collar in a clutch engaging direction.

9. In a power control unit which includes a clutch, and a shaft axially movable to engage and disengage the clutch; manual control means for said shaft comprising a sleeve mounted in fixed position axially beyond one end thereof, an internal adjustment nut threaded in the sleeve, means relatively rotatably connecting adjacent ends of said shaft and nut for axial movement together, a rotary collar on the sleeve adjacent its outer end, a radial plate on the corresponding end of the adjustment nut, said plate having an arcuate slot therein concentric to the axis of the collar, and lapping the latter, a normally tight, headed bolt extending through the slot and threaded into said collar, and a hand lever fixed on and radiating from said collar.

10. A power control unit as in claim 9 which embodies a brake unit, said unit including a longitudinally movable, brake release link extending to a point adjacent the rotary collar, said link being movable in a direction intersecting the axis of said collar, and means between said collar and link operative to shift the latter in a brake release direction upon rotation of the collar in a clutch engaging direction.

11. A power control unit as in claim 9 which embodies a brake unit, said unit including a longitudinally movable, brake release link extending to a point adjacent the rotary collar, said link being movable in a direction intersecting the axis of said collar, and means between said collar and link operative to shift the latter in a brake release direction upon rotation of the collar in a clutch engaging direction; said means between the collar and link comprising a rigid arm radiating from the collar toward the link, and a cross pin on the arm, the link having an elongated slot in which said pin engages, said pin abutting against one end of the slot and moving the link upon swinging of the hand lever in one direction.

STANLEY S. MOORE.

REFERENCES CITED

The following references are of record in the file of this patent:

UNITED STATES PATENTS

| Number | Name | Date |
|---|---|---|
| 568,197 | Hitchon | Sept. 22, 1896 |
| 820,122 | Morrice et al. | May 8, 1906 |
| 1,238,075 | Adams | Aug. 28, 1917 |
| 1,912,645 | Le Tourneau | June 6, 1933 |

FOREIGN PATENTS

| Number | Country | Date |
|---|---|---|
| 228,065 | Great Britain | Jan. 29, 1925 |